United States Patent [19]

Chrysostome et al.

[11] Patent Number: 4,552,203

[45] Date of Patent: Nov. 12, 1985

[54] METHOD AND DEVICE FOR CONTROLLING THE TEMPERATURE OF A REACTION CARRIED OUT IN A FLUIDIZED BED

[75] Inventors: Gérard Chrysostome, Creusot; Daniel Borgnat, Montchanin, both of France

[73] Assignee: Creusot-Loire, Paris, France

[21] Appl. No.: 487,672

[22] Filed: Apr. 22, 1983

[30] Foreign Application Priority Data

Apr. 28, 1982 [FR] France .............................. 82 07379

[51] Int. Cl.$^4$ ............................................ F28D 19/02
[52] U.S. Cl. ........................................ 165/1; 122/4 D;
110/245; 165/40; 165/104.16; 165/104.18;
422/146; 422/147; 422/145
[58] Field of Search ...................... 165/104.16, 104.18,
165/40, 1; 122/4 D; 422/146, 139, 143, 145,
147; 110/245

[56] References Cited

U.S. PATENT DOCUMENTS

| | | | |
|---|---|---|---|
| 2,580,635 | 1/1952 | Winter, Jr. ...................... | 165/104.18 |
| 2,698,171 | 12/1954 | Schoenmabers ................ | 165/104.18 |
| 4,311,670 | 1/1982 | Nieminen et al. ................ | 422/146 |
| 4,351,275 | 9/1982 | Bhojwani et al. ............... | 165/104.18 |

FOREIGN PATENT DOCUMENTS 1144661  3/1969  United Kingdom ........... 165/104.18

Primary Examiner—Albert W. Davis, Jr.
Attorney, Agent, or Firm—Pollock, Vande Sande & Priddy

[57] ABSTRACT

Method and a device for controlling the temperature of a reaction carried out within a vessel in a fluidized bed containing solid particles which can be entrained with the smoke and then recovered in a separating device and recycled into the fluidized bed after passage through a heat exchanger where they yield up their heat. The flow of particles separated from the smoke is divided into two parts, a hot part recycled directly into the fluidized bed and a cool part constituted by particles taken up at the outlet of the separating device and passed into the heat exchanger to constitute a reserve of cold material which can be mixed with the hot part before reinjection into the fluidized bed, the relative flow rates of the hot particles and of the cold particles being regulated so as to control the flow-rate and the average temperature of the flow of particles recycled into the fluidized bed for maintaining at the desired level the reaction temperature in the midst of the latter.

10 Claims, 3 Drawing Figures

METHOD AND DEVICE FOR CONTROLLING THE TEMPERATURE OF A REACTION CARRIED OUT IN A FLUIDIZED BED

FIELD OF THE INVENTION

The invention relates to a method and a device for controlling the temperature of a reaction carried out in a fluidized bed.

BACKGROUND OF THE INVENTION

By reason of their high heat capacity, fluidized beds have long been used for conducting all types of reactions bringing into play large amounts of heat energy, such as chemical reactions, gasification of hydrocarbon materials, production of cement or combustion of fuel material or of waste for the production of energy.

In certain cases, a fluidized bed of the circulating type is used, i.e., containing solid particles capable of being entrained with the gases emerging from the reaction chamber, then recovered in a separating device and recycled into the fluidized bed.

Circulating beds are used, for example, in gasification reactors or combustion chambers in which the burnt particles entrained with the smoke are recycled into the fluidized bed until combustion is completed.

The fluidized bed can also be constituted from inert particles. This is the case, for example, in French Pat. No. 2,209,074, which relates to a device for incinerating waste, in which the fluidized bed contains noncombustible particles which are entrained with the smoke and then, after separation, passed into a heat exchanger where they yield up their heat before being sent back into the combustion chamber, there to be reheated. In this method, the circulation of the particles only serves for the transfer of calories between the combustion chamber and the heat exchanger.

In addition, certain reactions must occur at a temperature which must remain relatively constant or indeed be maintained below a certain limit, for example to avoid the fusion of ash which can interfere with the operation of the fluidized bed, or indeed to carry out desulfuration.

To carry out temperature regulation of the fluidized bed, the latter is generally cooled either by injecting therein a moderator fluid such as air, water or steam, or by immersing therein tubes cooled by the circulation of a heat transfer fluid which can, for example, produce steam or hot water.

The injection of a moderator fluid into the bed, which is used notably in gasification reactors, has the drawback of reducing the quality of the gas produced. The cooling of the fluidized bed by immersed tubes avoids this drawback but limits the flexibility of the installations. In fact, the exchange coefficient is relatively constant and one is led therefore, in certain applications, to partition the fluidized bed into compartments and to adjust the number of the compartments according to the power required, this obviously complicates the installation.

It is an object of the invention to provide a method and a device which do not have these drawbacks while enabling the continuous adjustment of the temperature of the fluidized bed to a certain level.

For this purpose, the fluidized bed operates as a circulating bed for at least a part of the solid particles that it contains, and it is associated with a heat exchanger connected in parallel to the recycling circuit of the particles.

SUMMARY OF THE INVENTION

According to the invention, the flow of particles separated from the smoke is divided into two parts, a hot part recycled directly into the fluidized bed and a cooled part constituted by particles taken at the outlet of the separating device and passing into the heat exchanger to constitute a reserve of cooled material which can be mixed with the hot part before reinjection into the fluidized bed, the relative flow rates of hot and cold particles being regulated so as to control the flow rate and the average temperature of the flow of particles recycled in the fluidised bed to maintain it at the desired level of the reaction temperature within the latter.

The invention is applicable more specially to the temperature regulation of a fluidized bed used for the gasification of a ligno-cellulosic material such as sawmill waste, wood shavings or, generally, materials encompassed in the term biomass.

In such as installation, the oxygen introduced at the base of the reactor maintains the fluidized bed in suspension and enables the gasification. However, due to the fact that the wood produces little ash, it is generally preferred to use a fluidized bed formed by inert supporting material constituted by incombustible particles capable of being suspended as such, for example sand or alumina, and in the midst of which the wood particles are distributed.

According to the invention, there is introduced into the solid fluidized material a certain amount of fine particles intended to constitute the cold material kept in reserve to serve for the regulation of the temperature of the fluidized bed.

In this case, an essential characteristic of the method therefore resides in the fact that if the fluidized material does not contain or does not produce fines capable of being entrained with the smoke, it is preferred to add to it a certain amount of fines which is placed in circulation by passing through a heat exchanger, so as to obtain control means for the temperature of the fluidized bed sufficiently flexible to carry out true temperature regulation without, however, interfering with the composition of the gases produced.

The invention also covers a device enabling the employment of the method for the control of the temperature of a reaction carried out in the fluidized bed inside a reaction chamber operating as a circulating bed connected by a chimney to a separator of solid particles entrained with the smoke, discharging into a recycling circuit in the fluidized bed the recovered particles.

The device according to the invention comprises a heat exchanger connected in a branched circuit of one part of the recovered particles joining the recirculation duct up-stream of the point of reintroduction into the chamber, the branch circuit comprising a control member for the relative flow rates of the recycled hot and cold particles.

Thus, whereas in prior art methods the role of the solid particules in the reaction could be to serve as fuel, as catalyst or as simple fluidization support, in the method and device according to the invention the fine particles entrained with the smoke are given an additional role which may even be essential, and which consists of serving as a reserve of cold material from which it is possible to withdraw a certain amount of particles which are recycled into the fluidized bed at a controlled flow rate so as to ensure regulation of the temperature of the reaction in the midst of the fluidized bed.

BRIEF DESCRIPTION OF THE DRAWINGS

The invention will be more clearly understood with reference to a particular embodiment given purely by way of example and shown in the accompanying drawing, in which.

DETAILED DESCRIPTION

As has been indicated, the invention is particularly well adapted to so-called "circulating bed" reactors used when the fluidization gas has considerable velocity and/or when it is desired to increase the dwell time of the treated particles.

Figure 1:
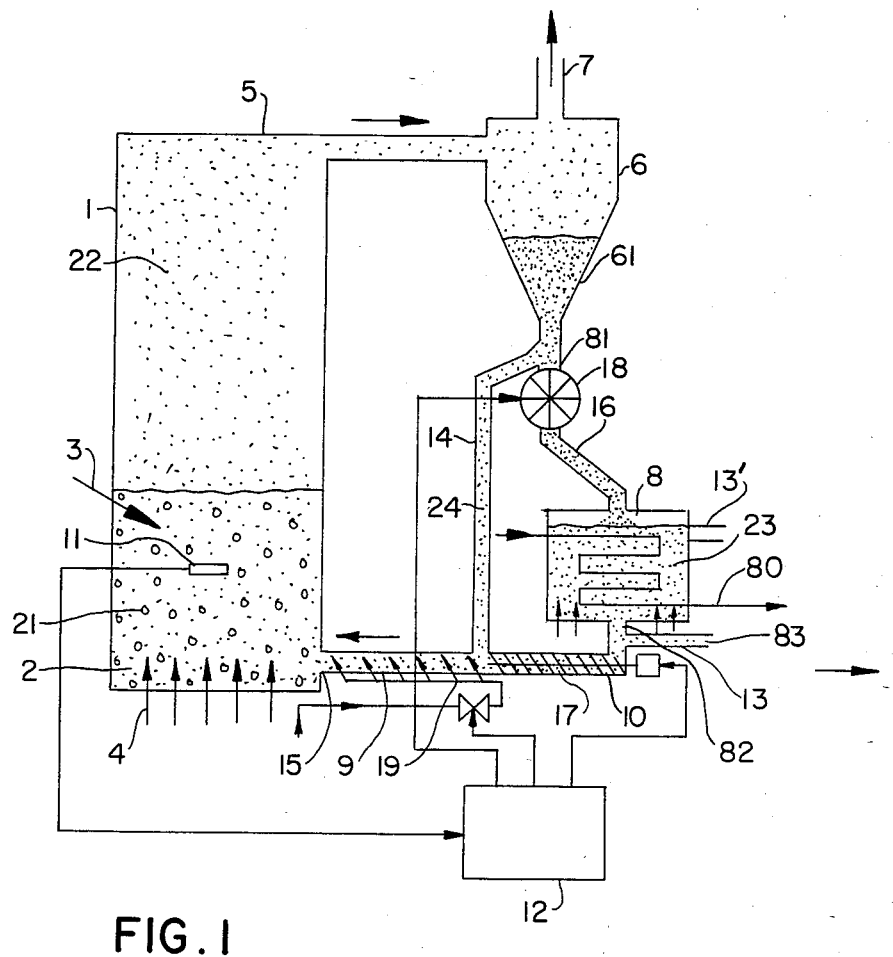
FIG. 1 shows diagrammatically a fluidized bed reactor provided with a control device according to the invention.

FIG. 1 shows diagrammatically such an installation, including a cylindrical vessel 1 constituting the reactor, provided at its base with means 4 for the injection of fluidization gas to constitute a fluidized bed 2 of solid material. The vessel 1 is connected at its upper part through a chimney 5 to a recovery chamber 6 whose base 61 is itself connected by a recirculation duct 14 to an inlet pipe 9 opening into an inlet 15 through which material recovered in the cyclone 6 is reinjected into the fluidized bed.

In the example shown, the velocity of the gases introduced through the injectors 4 is such that a considerable proportion of the solid matter forms a dilute suspension in the upper part of the vessel 1 and escapes through the chimney 5. There is hence established, in known manner, a circulation circuit of the finest particles between the vessel 1 and the cyclone 6 connected through the ducts 5 and 14, the heaviest particles 21 filling a denser zone 2, at the base of the reactor 1. It is thus possible to control the dwell time of a combustible material since the heaviest particles remain in the dense zone 2 and the finest particles 22 entrained by the smoke and including also a combustible portion are sent into the fluidized bed through the duct 14.

When the product to be gasified is coal, the smoke entrains the fine ash which is trapped in a recovery chamber 6 constituted normally by one or several cyclones into which is introduced the smoke through chimney 5, the gases being removed through a duct 7 while the recovered fines are collected at the base 61 of the cyclone 6.

When the material to be gasified is biomass, and in particular wood chips or shavings producing very little ash, the use of the cyclone 6 for the recovery of the fines may not be necessary. One of the characteristics of the method according to the invention resides precisely in the fact that it is arranged so that the fluidized bed may contain a certain amount of fine particles which can be entrained in all cases with the smoke and recovered in the cyclone 6. Thus, in the case of gasification of wood, it is possible to introduce into the inert material 2 serving as a support for the fluidization, a certain amount of particles 22 of fine granulometry intended essentially to be entrained with the smoke and recovered in the cyclone 6.

According to an essential feature of the invention, at least one part 23 of the fines recovered in the cyclone 6 serves as a reserve of cold material intended to ensure the temperature regulation of the fluidized bed and, for this purpose, passes into a heat exchanger 8 which, preferably, is connected in parallel with the recycling circuit 14, in a branch circuit 16, 17.

The exchanger 8 is constituted, conventionally, by a vertical chamber including cooling means such as tubes 80 traversed by a heat carrying fluid and constituting an exchange surface. The chamber 8 is provided with an upper orifice 81 into which opens a branch duct 16 connected to the beginning of the recirculation duct 14, downstream of the outlet 61 of the cyclone 6, and a lower orifice 82 opening into an outlet pipe 17 connected to the feed duct 9, for example at the opening of the recycling duct 14, and in which is placed a control member 10 for the flow rate of recycled cold material 23.

Member 10 may be a screw pump driven by a motor whose rotational speed is controlled by regulating device 12. The fine particles emerging from exchanger 8 can thus be entrained at a variable speed by the screw pump toward recycling circuit 9. In the latter, a gas injection conduit, well known per se, enables the particles to be made to circulate.

Figure 3:
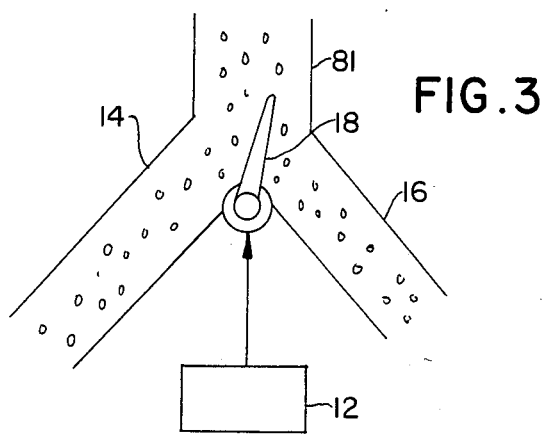
FIG. 3 is a detail view of a throttle valve for regulating the proportion of fine particles withdrawn from the flow.

The proportion of fine particles withdrawn through the branch pipe 16 may be constant or indeed regulated by a valve 18 located in the fork of the ducts 14 and 16. This may be a simple throttle valve placed directly at the bifurcation of the circuits 14 and 16, the orientation of this valve (shown in FIG. 3) being controlled by regulating device 12 as a function of the reaction temperature. However, it is also possible to simply place on circuit 16, just downstream of the inlet of recycling circuit 14, a flow control device such as a rotary lock. In this case, a variable flow of particles passes through this lock as a function of the rotation of the latter, the remainder of the particles passing into the recycling circuit 14. It is this type of arrangement which has been shown in the attached figures.

It would also be possible to locate a rotary lock 10 for controlling the flow of cold particles at the outlet of exchanger 8. A screw pump 19 would then take up first the flow of cold particles emerging from exchanger 8, and then the hot particles 24 emerging from recycling circuit 14, in order to reintroduce them at the inlet 15 to the combustion chamber. Such an arrangement is shown schematically in FIG. 2.

Fine particles 22 recovered by the cyclone 6 and withdrawn through the branch duct 16 are collected in the chamber 8 where they form a dense bed 23 which circulates downwardly, cooling in contact with the tubes 80. The control member 10 of the flow rate of the fines recycled through the duct 17 may be of any suitable type, but is, for example, a rotary lock, a screw-type pump, or simply a gas jet with adjustable flow rate. Preferably, the temperature of the fluidized bed measured by a sensor 11 enables, by means of a regulating device 12 easy to design, the adjustment of the flow rate recycled through the control member 10. The dimensions of the exchanger are arranged for the maximum flow rate and it is hence possible, to a certain extent, to absorb an excess flow of fines. However, the excessive amount may also be removed through an outlet 13.

Thus, a means for regulating the temperature of the fluidized bed 2 has been described which does not run the risk of interfering with the composition of the gases produced by the gasification reaction and which has however a very short response time, the exchanger 8 keeping in reserve a considerable amount of cooled fines from which it is possible to draw according to need for the maintenance of the temperature of the fluidized bed 2.

In addition, it is possible to cause the discharge duct 13 to open into a reserve serving as an overflow and from which it is possible to withdraw, in order, if necessary, to contribute to the fluidized bed a considerable flow rate of cooled fines.

Figure 2:
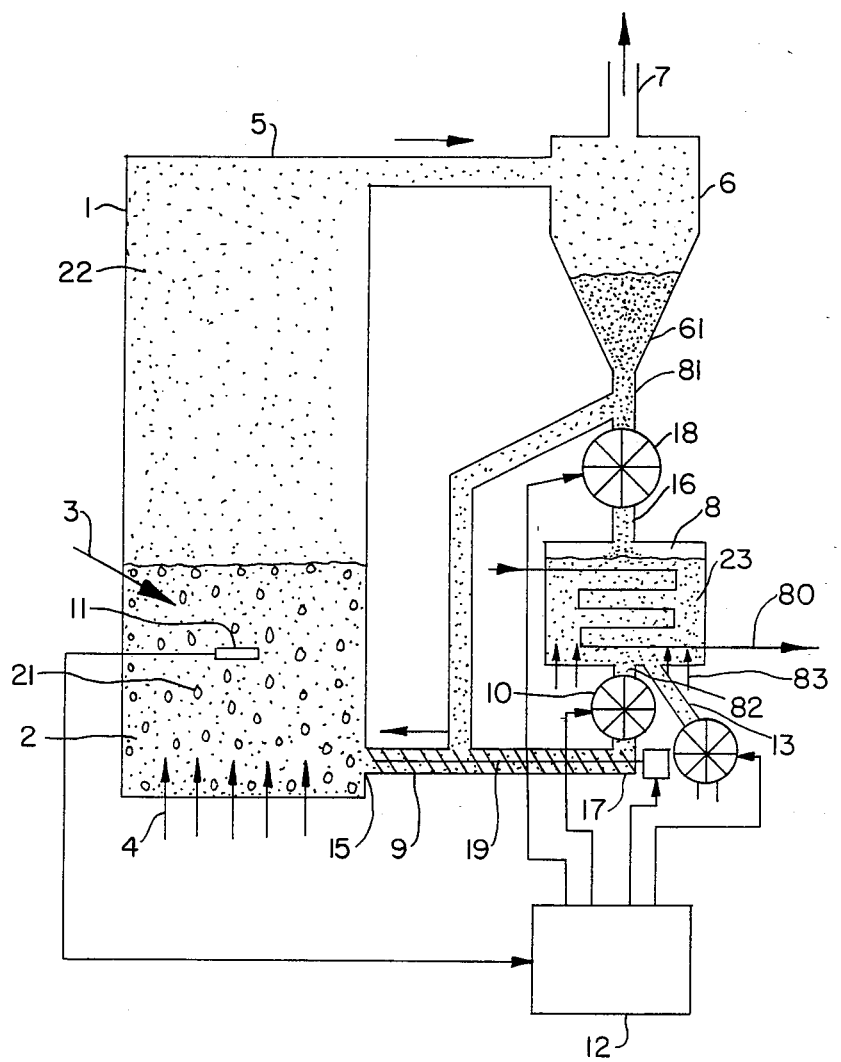
FIG. 2 shows a second embodiment of the elements for control of particle flow.

Discharge duct 13, which may allow an excessive quantity of fines to be evacuated, may be branched either directly on the outlet conduit of exchanger 8, upstream of control member 10, or an auxiliary outlet 13' branched at a desired level of exchanger 8, as illustrated in FIG. 1, or at the bottom of exchanger 8, as shown in FIG. 2. This outlet 13 can be provided with a rotary lock. Such a device is well known, and has been shown only schematically.

The exchanger 8 can be cooled by any means and may or may not produce recoverable energy. To increase the cooling level, it is possible to introduce at its base a cooling fluid such as steam or air through jets 83, with a flow rate sufficiently low not to interfere with the operation of the cyclone 6, the chamber 8 being provided at its upper part with removal means for the gases which have traversed the solid material 23.

Of course, the possibility, according to the invention, of regulating the temperature of the fluidized bed 2 by the injection of cooled fines does not prevent the introduction, through the injectors 4 at the base of the reactor 1, of a certain flow rate of steam which acts as a moderator. However, due to the invention, it will be possible to limit the amount of steam injected with the oxygen to the minimum threshold necessary for the gasification reaction, the additional amount necessary for the adjustment of the temperature being replaced by the desired flow rate of recycled fines.

The control member 10 of the flow rate of cold material, in particular if it is associated with a dividing valve 18, enables the regulation of the relative flow rates of the hot and cold material introduced into the reactor through the duct 9. However, to regulate more flexibility the flow rate and the average temperature of the recycled particles, it is possible to modify simultaneously and in reverse directions the flow rates of hot particles 24 and cold particles 23 by means of a valve 19 located at the junction of the ducts 14 and 17 with the feed duct 9.

The circulation of the fines and their introduction into the fluidized bed 2 may necessitate the employment of special means which are not described here, this problem being already known in the operation of circulating beds.

As indicated in the illustrated embodiment, the cooling of the fines in the exchanger 8 may be regulated either by modifying the speed of downward circulation of the fines or the intensity of cooling. In general, the group of regulating means can be controlled by a servo-coupling circuit comprising a control unit 12 receiving different information and particularly the temperature of the fluidized bed given by the sensor 11 and giving actuating orders to the various regulating means.

The reserve of cold material 23 may be constituted by the exchanger 8 itself, if it is of sufficient dimensions, or indeed by an additional capacity placed downstream of the exchanger 8 or even, as has been indicated, in an additional circuit fed by the duct 13. It would also be possible, under certain conditions, to place a reserve of hot material 24 in the recycling circuit 14 so as to act more easily on the flow rates of hot material 24 and cold material 23.

On the other hand, as has been indicated, the invention may be applied in all cases where it is desired to control the temperature of an exothermic reaction carried out in the fluidized bed, such as for example the gasification or the combustion of hydrocarbon materials, the incineration of waste, the roasting of sulphur-containing ores such as pyrites, blends, silver sulfides etc., as in the chemical industry.

We claim:

1. Method for controlling the temperature of a reaction conducted inside a vessel, in a fluidized bed containing solid particles which can be entrained with smoke and then recovered in a separating device and recycled into said fluidized bed after passage into a heat exchanger where they yield up their heat, said method comprising the steps of
    (a) dividing the flow of particles separated from said smoke into two parts, namely, a hot part recycled directly into said fluidized bed and a cooled part constituted by particles taken up at the outlet of said separating device;
    (b) passing it into said heat exchanger to constitute a reserve of cold material which can be mixed with said hot part before reinjection into said fluidized bed; and
    (c) regulating the relative flow rates of hot particles and of cold particles so as to control the flow rate and the average temperature of the flow of particles recycled into said fluidized bed to maintain it at the desired level of the reaction temperature in the midst of the latter.

2. Method according to claim 1, for the temperature of a fluidized bed constituted from a suspended inert material within which the gasification of lignocellulose material is carried out, said method comprising maintaining in the fluidizing inert material a certain amount of fine particles which can be entrained with said smoke, recovering and then cooling said fine particles and recycling them into said fluidized bed with a controlled flow rate and controlled average temperature.

3. Control device for the temperature of a reaction carried out in a fluidized bed within a vertical vessel in which is arranged a fluidized bed of material to be treated comprising heavy particles and fine particles, said vessel being provided at its lower part with means for the injection of a fluid at a speed such that a large proportion of said fine particles is entrained toward a chimney for the removal of gases located at an upper part of said vessel and discharging into a recovery chamber for said fine particles entrained with the gases, connected to a base of said fluidization vessel through a circuit for recycling said recovered fine particles into said fluidized bed, said device comprising
    (a) a heat exchanger supplied with a portion of said recycled fine particles via a feed pipe branched from said recycling circuit upstream of said recovery chamber, said heat exchanger being constituted by a chamber provided with cooling means and having dimensions sufficient for constituting a reserve of cold particles;

(b) means for recycling the flow of particles separated in the recycling circuit and diverted to said heat exchanger;

(c) a circuit for reinserting a variable flow of cold particles into the flux of recycled hot particles, comprising a conduit branched off at the outlet of said exchanger, debouching into a circuit for recycling hot particles and provided with means for controlling the flow of reinserted cold particles;

(d) means for measuring the temperature of said fluidized bed; and (e) control device acting at least on said means for controlling the flow of reinserted cold particles as a function of the temperature of said fluidized bed for maintaining the latter at a desired level.

4. Control device according to claim 3, wherein said recycling circuit comprises a valve for regulating the flow rate of particles directed to said heat exchanger, located at the junction of said feed pipe with a recycling pipe.

5. Control device according to claim 3, wherein said recycling circuit comprises a valve for regulating in reverse direction the relative flow rates of hot particles and cold particles, placed at the junction of said outlet of said exchanger with a recycling pipe.

6. Control device according to claim 4, wherein said recycling circuit comprises a valve for regulating in reverse direction the relative flow rates of hot particles and cold particles, placed at the junction of said outlet of said exchanger with a recycling pipe.

7. Control device according to claim 3, wherein a group of regulating means is controlled by a regulating member receiving information on the temperature existing in said fluidized bed from a sensor and giving flow rate regulation commands to components of said group.

8. Control device according to claim 4, wherein a group of regulating means is controlled by a regulating member receiving information on the temperature existing in said fluidized bed from a sensor and giving flow rate regulation commands to components of said group.

9. Control device according to claim 5, wherein a group of regulating means is controlled by a regulating member receiving information on the temperature existing in said fluidized bed from a sensor and giving flow rate regulation commands to components of said group.

10. Control device according to claim 6, wherein a group of regulating means is controlled by a regulating member receiving information on the temperature existing in said fluidized bed from a sensor and giving flow rate regulation commands to components of said group.

* * * * *